United States Patent
Liegard et al.

(10) Patent No.: US 11,945,549 B2
(45) Date of Patent: Apr. 2, 2024

(54) METHOD FOR INSTALLING A TENSION LEG PLATFORM BASED FLOATING OBJECT

(71) Applicant: SINGLE BUOY MOORINGS INC., Marly (CH)

(72) Inventors: Julien Liegard, Bât. Aigue Marine (MC); Eric Sebellin, Bât. Aigue Marine (MC)

(73) Assignee: SINGLE BUOY MOORINGS INC., Marly (CH)

( * ) Notice: Subject to any disclaimer, the term of this patent is extended or adjusted under 35 U.S.C. 154(b) by 227 days.

(21) Appl. No.: 17/635,826

(22) PCT Filed: Aug. 19, 2020

(86) PCT No.: PCT/EP2020/073214
§ 371 (c)(1),
(2) Date: Feb. 16, 2022

(87) PCT Pub. No.: WO2021/032785
PCT Pub. Date: Feb. 25, 2021

(65) Prior Publication Data
US 2022/0297802 A1    Sep. 22, 2022

(30) Foreign Application Priority Data

Aug. 20, 2019 (EP) ..................................... 19192621
Nov. 8, 2019 (EP) ..................................... 19208090

(51) Int. Cl.
*B63B 21/50* (2006.01)
*B63B 35/44* (2006.01)
(Continued)

(52) U.S. Cl.
CPC ............ *B63B 21/502* (2013.01); *B63B 35/44* (2013.01); *F03D 13/25* (2016.05); *B63B 2021/003* (2013.01); *B63B 2021/505* (2013.01)

(58) Field of Classification Search
CPC . B63B 21/502; B63B 2021/505; B63B 35/44; F03D 13/25
(Continued)

(56) References Cited

U.S. PATENT DOCUMENTS 3,955,521 A * 5/1976 Mott ...................... B63B 21/502
114/294
3,983,706 A * 10/1976 Kalinowski ........... E21B 19/004
175/7
(Continued)

FOREIGN PATENT DOCUMENTS

| CN | 103917439 A | * 7/2014 | ............. B63B 1/107 |
| EP | 0 441 413 | 8/1991 | |
| WO | 2016/207427 | 12/2016 | |

OTHER PUBLICATIONS

International Search Report for PCT/EP2020/073214, dated Oct. 28, 2020, 3 pages.
Written Opinion of the ISA for PCT/EP2020/073214, dated Oct. 28, 2020, 5 pages.

*Primary Examiner* — Frederick L Lagman
(74) *Attorney, Agent, or Firm* — NIXON & VANDERHYE

(57) ABSTRACT

A method for installing a TLP based floating object at anchor points. The floating object includes a central body and buoyancy assemblies positioned around the central body in a horizontal plane, with each buoyancy assembly connected to the central body and connectable to one of the anchor points. The method includes: attaching a mooring leg including a mooring line at each anchor point; for each anchor point connecting a pull-down line between the buoyancy assembly and the anchor point; tensioning the pull-down (Continued)

lines so the floating object is lowered to an installation level below an operational level; for each anchor point connecting the mooring leg with the buoyancy assembly in slack mode; and after connecting the mooring lines with the buoyancy assemblies, paying out the pull-down lines so the floating object rises upward from the installation level to the operational level where the mooring legs are tensioned.

20 Claims, 8 Drawing Sheets

(51) Int. Cl.
*F03D 13/25* (2016.01)
*B63B 21/00* (2006.01)

(58) Field of Classification Search
USPC .................................................. 405/223.1
See application file for complete search history.

(56) References Cited

U.S. PATENT DOCUMENTS

| | | | |
|---|---|---|---|
| 4,421,436 A * | 12/1983 | Burns | B63B 1/107 405/195.1 |
| 4,938,632 A * | 7/1990 | Eie | B63B 21/502 405/195.1 |
| 7,278,801 B2 * | 10/2007 | Chianis | B63B 77/00 405/223.1 |
| 7,452,162 B2 | 11/2008 | Wybro et al. | |
| 2003/0123936 A1 * | 7/2003 | Karal | B63B 21/502 405/223.1 |
| 2004/0190999 A1 * | 9/2004 | Wybro | B63B 35/4413 405/203 |
| 2014/0017014 A1 * | 1/2014 | Pollack | B63B 21/502 405/203 |
| 2014/0026796 A1 | 1/2014 | Leverette et al. | |

* cited by examiner

METHOD FOR INSTALLING A TENSION LEG PLATFORM BASED FLOATING OBJECT

This application is the U.S. national phase of International Application No. PCT/EP2020/073214 filed 19 Aug. 2020, which designated the U.S. and claims priority to EP Patent Application No. 19192621.1 filed 20 Aug. 2019, and EP Patent Application No. 19208090.1 filed 8 Nov. 2019, the entire contents of each of which are hereby incorporated by reference.

BACKGROUND OF THE INVENTION

Field of the Invention

The present invention relates to a method for installing a tension leg platform based floating object.

Description of the Related Art

In the prior art, the installation of tension leg platform, TLP, based floating object is traditionally made by ballasting the hull, connecting the tendons, and deballasting to transfer the load to the tendons. According to the prior art, the tensioning system is coupled with the tendons or mooring lines, in a manner that the pull-in operation uses the mooring lines.

Such a method is known from U.S. Pat. No. 7,452,162 that discloses a method and system compensating for inherent hull instability during submergence and to provide motion arrest and aid in station keeping. The system includes tensioning devices mounted on the TLP, usually one for each tendon. Each tensioning device is equipped with a pull-down line which is connected to the corresponding tendon. The TLP hull is submerged to lock-off draft by applying tensions to the pull-down lines connected to the top of the tensions, or by a combination of applying tensions to the pull-down lines and ballasting the hull. As the tensioners take in pull-down line, the hull submerges, i.e. the draft increases.

This type of operation has a disadvantage in that the TLP becomes stabilized during the installation of the mooring lines. In particular, a floating object equipped with a superstructure that protrudes relatively high above the water surface can only be installed under (very) calm sea states to avoid risk of instability of the floating object.

It is an object of the present invention to overcome or mitigate the problem of the prior art.

SUMMARY OF THE INVENTION

The object is achieved by a method for installing a tension leg platform based floating object at anchor points at sea using an installation vessel and a remotely operated underwater vehicle, ROV; the floating object comprising a central body and at least three buoyancy assemblies positioned around the central body in a horizontal plane, with each of the buoyancy assemblies at least connected to the central body and adapted to be connected to an associated one of the anchor points, the method comprising: •attaching a mooring leg comprising at least one mooring line at each anchor point; •for each anchor point connecting a pull-down line between each buoyancy assembly and its associated anchor point; tensioning the pull-down lines such that the floating object is lowered with respect to the water surface to an installation elevation level below an operational elevation level; •for each anchor point connecting the mooring leg with the associated buoyancy assembly while the mooring leg is in slack mode; •after connecting the mooring lines with the buoyancy assemblies, paying out the pull-down lines to transfer load to the mooring legs such that the floating object rises upward from the installation elevation level to the operational elevation level where the mooring lines are in tensioned mode.

The pull-down operation from the seafloor anchor points underneath the floater will result in a better stability performance. Moreover, the pull-down operation of the TLP is decoupled from the installation of the mooring legs, which simplifies the operation to connect the mooring legs to the floating object.

BRIEF DESCRIPTION OF THE DRAWINGS

Embodiments of the present invention will be described hereinafter, by way of example only, with reference to the accompanying drawings which are schematic in nature and therefore not necessarily drawn to scale. In the drawings, identical or similar elements are indicated by the same reference sign.

DESCRIPTION OF THE PREFERRED EMBODIMENTS

The method described below relates to the installation of a tension leg platform (TLP) based floating object at a location at a lake or at sea.

Such a floating object typically is a floating construction which comprises a central body and at least three buoyancy assemblies positioned around the central body in a horizontal plane, with each of the buoyancy assemblies at least connected to the central body.

The invention will be described with reference to a floating wind turbine as an example of a TLP based floating object. It will be appreciated that the invention is not limited to this example but can also relate to other types of TLP based floating objects.

The method relates to an installation of a floating object such as a floating wind turbine (or offshore wind turbine) that is to be installed offshore at a mooring location with a water depth where no direct mounting of the wind turbine on the seafloor by means of a pillar is possible.

In such situation for a floating wind turbine, the tower of the wind turbine is arranged on the floating construction.

Figure 1:
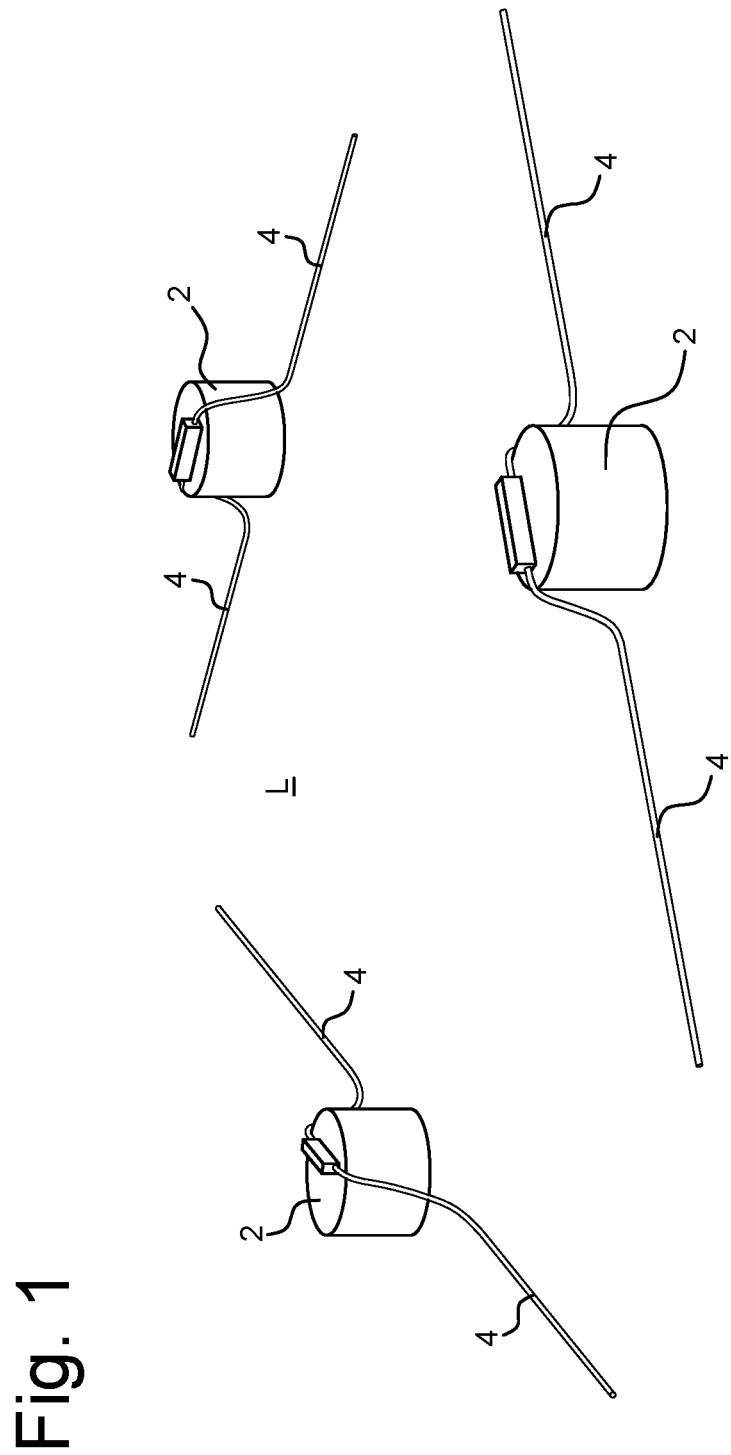
FIG. 1 shows a schematic top view of an anchoring location at a seafloor during initial method steps according to an embodiment of the invention.

FIG. 1 shows a schematic top view of an anchoring location at a seafloor during initial method steps according to an embodiment of the invention.

On the seafloor a mooring location L is determined where the TLP floating object is to be installed.

According to the invention, anchor points 2 are installed on or in the seafloor at the mooring location. The anchor point may be selected from an anchor, an anchoring pile and an anchoring body.

The number of anchor points usually will correspond with the number of buoyancy assemblies that are part of the floating wind turbine. For example, if the floating wind turbine comprises three buoyancy assemblies, three anchor points are to be installed.

The buoyancy assemblies are each provided with one or more mooring line connectors (depending on the number of mooring lines between the anchor point and the associated buoyancy assembly).

The installation of the anchor points is done by equipment such as an installation vessel equipped for installing anchor points.

In a next step, on each anchor point 2 a mooring leg 4 comprising at least one mooring line is attached at one end of the respective anchor point. Each of the mooring legs is laid down on the seafloor with a recovery loop in a manner that there is no crossing or entanglement of two or more of the mooring legs 4 on the sea floor. Optionally, the mooring leg 4 is attached to the anchor point by means of a line connector.

In a further embodiment, the TLP floating object is designed to have two mooring lines within each mooring leg 4 between each anchor point 2 and the buoyancy assembly that is associated with the anchor point. Again, each of the mooring lines is laid down on the seafloor with a recovery loop in a manner that there is no crossing of two or more of the mooring lines 4 on the sea floor.

Figure 2:
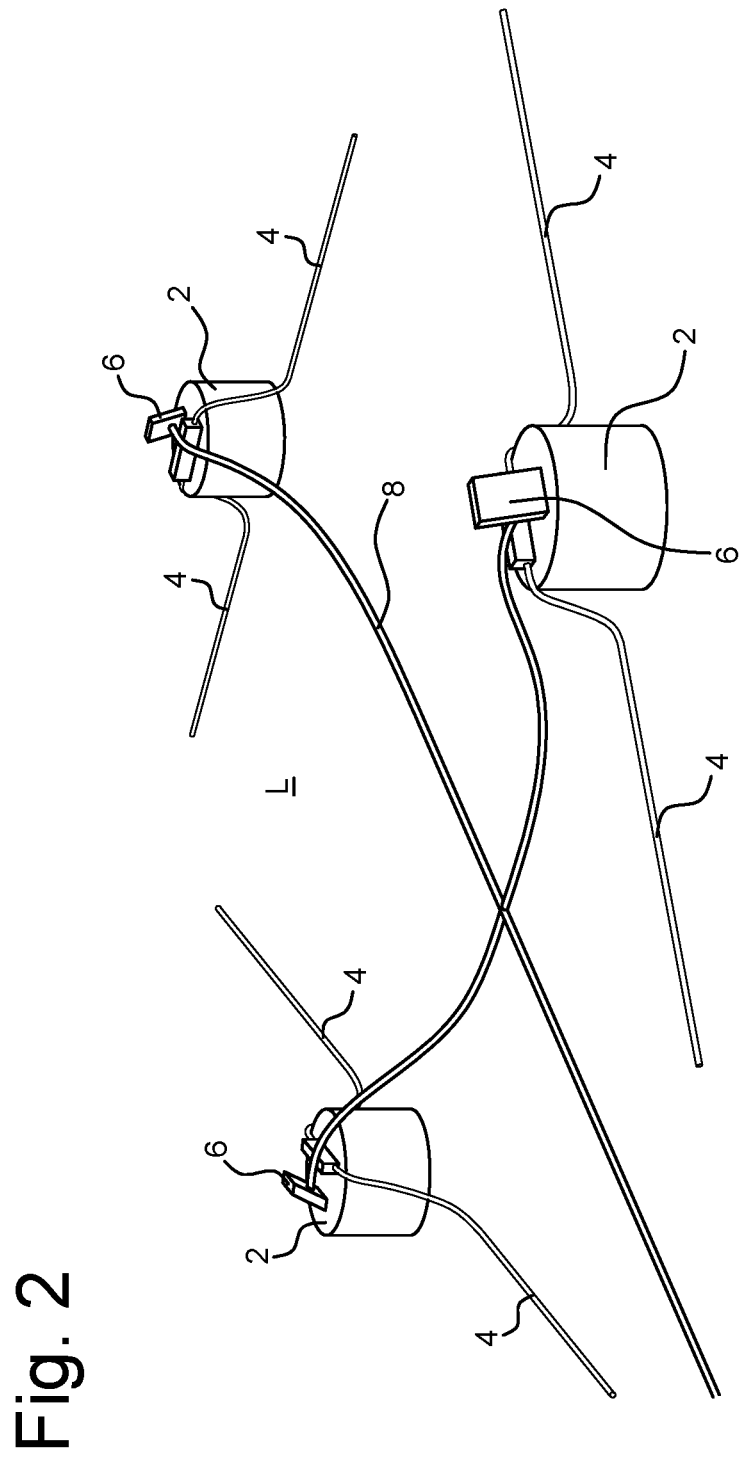
FIG. 2 show a schematic top view of the anchor points with a hydraulic tensioner device installed on each anchor point.

FIG. 2 shows a schematic top view of the anchor points with a hydraulic tensioner device installed on each anchor point.

In a next step of the method, on each anchor point a subsea tensioner 6 is installed. Each subsea tensioner is preferably pre-oriented in an upward tensioning direction to match mooring leg or mooring line inclination.

In addition, hydraulic support systems 8 to drive the subsea tensioners, are installed on the subsea tensioners 6.

The hydraulic support systems 8 comprise hydraulic hoses that are configured to connect to hydraulic pump, for example installed on the installation vessel or another vessel.

The installation is done with assistance from a remotely operated underwater vehicle (ROV) as known in the art.

The tensioners create a tensioning force for a tensioning operation using tensioning lines. The tensioning operation will be illustrated in more detail with reference to FIG. 6.

In an alternative embodiment, tensioning is done from the floating wind turbine. In that case, tensioners and hydraulic support systems are installed on the floating wind turbine or more in particular on the buoyancy assemblies.

Figure 3:
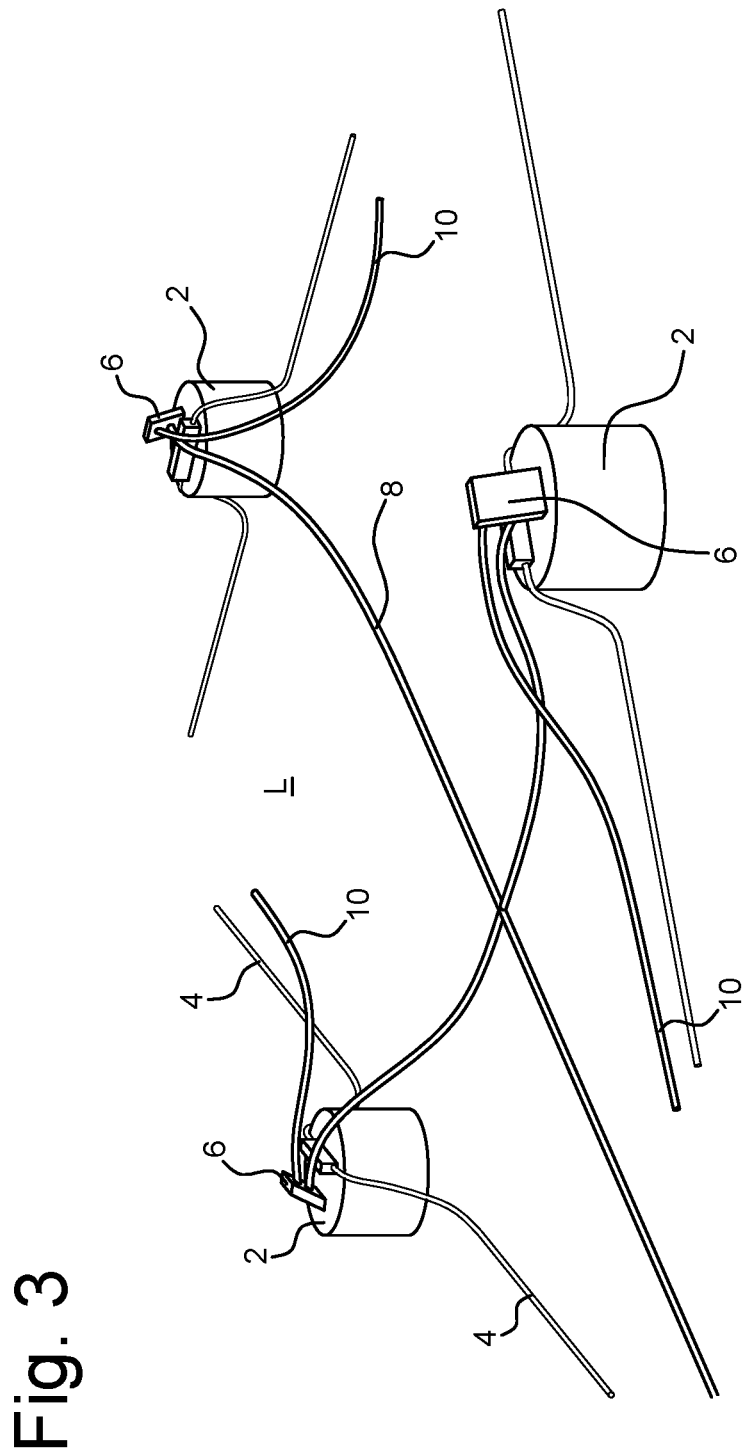
FIG. 3 show a schematic top view of the anchor points with a tensioning line attached to each tensioner device.

FIG. 3 show a schematic top view of the anchor points with a tensioning line attached to each tensioner device.

In a subsequent step, to each tensioner a tensioning line 10 is coupled with one end. A free end of each tensioning line 10 is laid down on the seafloor in a manner that there is no crossing of two or more of the tensioning lines 10. Also no crossing should occur with the mooring legs 4 laid down on the sea floor.

As shown in FIG. 3, on each anchor point the mooring leg 4 and a tensioning line 10 are connected. The free end of the mooring leg and the tensioning line is laid down on the seafloor. The lines are arranged in a manner that no entanglement occurs when at a later stage during installation one or more of the free ends are picked up.

Figure 4:
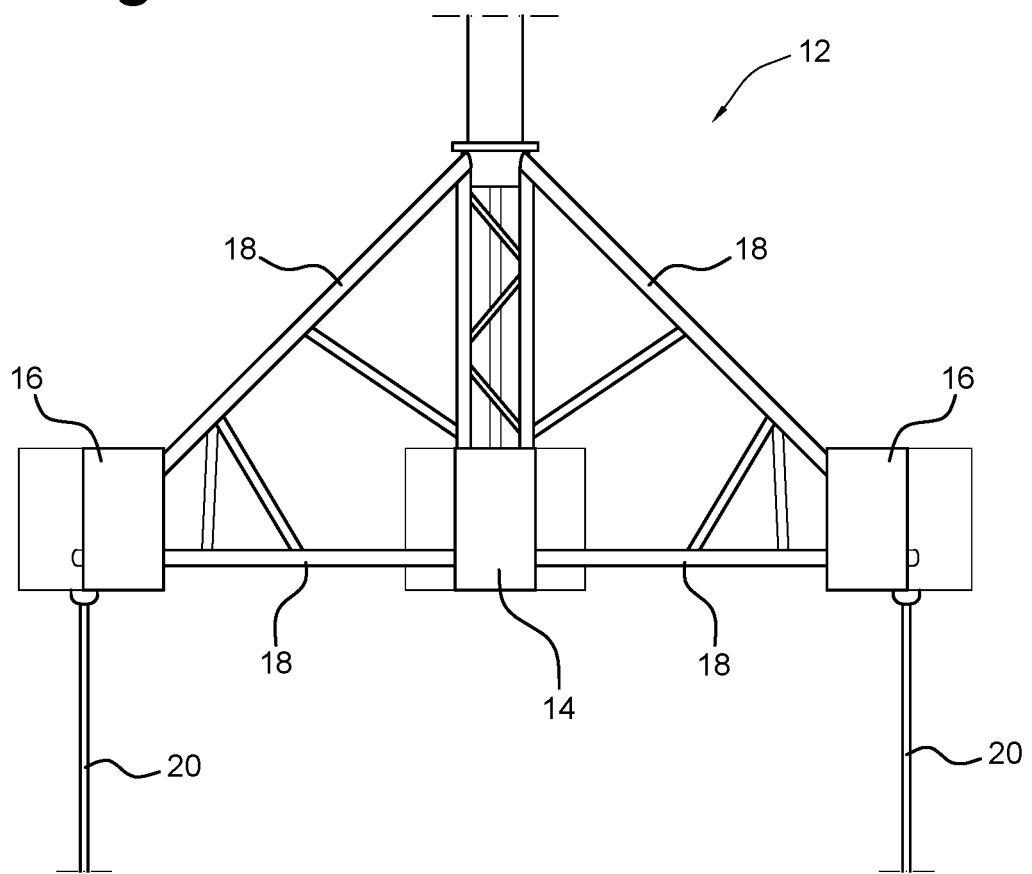
FIG. 4 shows a schematic side view of a floating object.

FIG. 4 shows a schematic side view of a floating wind turbine.

In an embodiment of the invention, the floating object is a floating wind turbine as described above: a floating construction 12 which comprises a central body 14 and at least three buoyancy assemblies 16 positioned around the central body in a horizontal plane, with each of the buoyancy assemblies 16 at least connected to the central body 14 by beams 18.

In accordance with the method, on each of the buoyancy assemblies 16 a messenger line 20 is installed with one end connected to a connector (not shown) on the respective buoyancy assembly 16. The other end may be secured on top of buoyancy module during towing operation.

In a further embodiment, the method comprises that a passive shock absorber (not shown) is arranged between the connector on the buoyancy assembly and the one end of the messenger line. This option provides that the shock absorber can prevent high dynamic peak loads during the initial phase of the tensioning operation as described below with reference to FIG. 8.

When during installation the floating wind turbine 12 arrives at the mooring location L, the method comprises to release the messenger lines 20 so that they hang free from the floating wind turbine 12. The release step may be done remotely.

Figure 5:
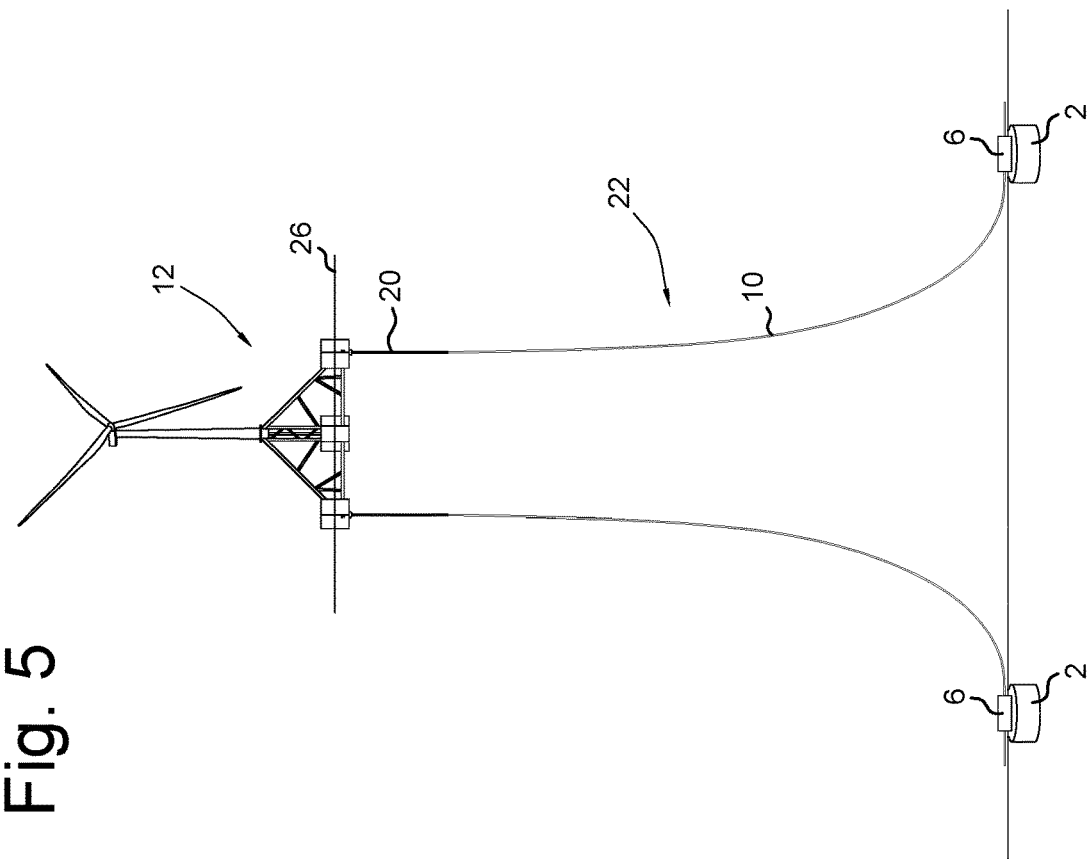
FIG. 5 shows schematically a step of connecting a tensioning line and a messenger line.

FIG. 5 shows schematically a step of connecting a tensioning line and a messenger line.

During this step, the free end of the tensioning line 10 connected to one of the anchor points is picked up by the installation vessel and brought close to the free hanging end of the messenger line 20 connected to the associated buoyancy assembly. With assistance of ROV, the free end of the tensioning line is then coupled mechanically to the free hanging end of the messenger line to form a pull-down line 22 between the anchor point 2 and the associated buoyancy assembly 16. A crane of the installation vessel is used to pick up the free end of the tensioning line from the seafloor and bring this free end close to the free hanging end of the messenger line. Then the ROV is used to complete the coupling.

This step is repeated for each of the anchor points.

During this step, the formed pull-down lines 22 are arranged to be in a slack mode, i.e., are not tensioned, to avoid destabilizing the floating wind turbine 12.

In a further embodiment, the step of coupling the free ends of the tensioning line 10 and the messenger line 20 comprises that the free end of the messenger line is mechanically connected with a first end of a shock stabilizer element (not shown) and a second end of the shock stabilizer element is mechanically connected with the free end of the associated tensioning line.

According to this further embodiment, the pull-down line 22 thus comprises a shock stabilizer element intermediate the tensioning line 10 and the messenger line 20. Advantageously, the shock stabilizer element provides that high dynamic peak loads are prevented during the initial phase of the tensioning of the pull down line, when the floating wind turbine is not yet stabilized by the pull-down lines.

Figure 6:
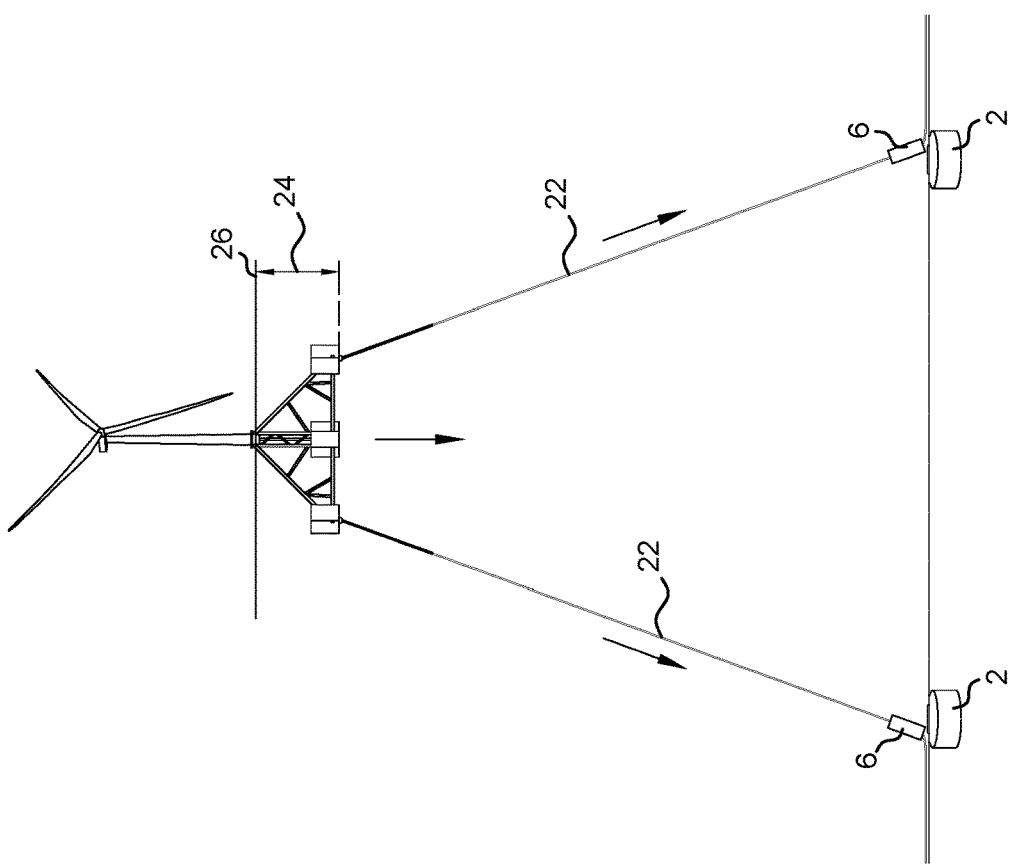
FIG. 6 shows schematically a step of tensioning the connected tensioning line and messenger line and lowering the floating object to an installation level below sea surface.

FIG. 6 shows schematically a step of tensioning the connected tensioning line 10 and messenger line 20 and lowering the floating wind turbine 22 to an installation elevation level 24 below water surface 26.

After each pull-down line 22 is connected to its associated anchor point 2 at one end and the associated buoyancy assembly 16 of the floating wind turbine 12 at the other end, in a subsequent step, the pull-down lines are tensioned at the same time by the subsea tensioners 6. The tensioners 6 are arranged to control the tension force in each of the pull down lines 22 to keep the floating wind turbine substantially in balance during this operation. To this end, the tensioners 6 are hydraulic devices actuated/driven by a synchronized hydraulic system.

During the tensioning operation, the floating wind turbine 12 is lowered with respect to the water surface 26 to an installation elevation level 24. For example the floating wind turbine is lowered to about 35 metres.

By lowering the floating wind turbine 12 with respect to the water surface 26, the floating wind turbine 12 is stabilized and put in 'storm safe' situation, well before the mooring legs 4 are attached between the anchor points 2 and the buoyancy assemblies 16.

Figure 7:
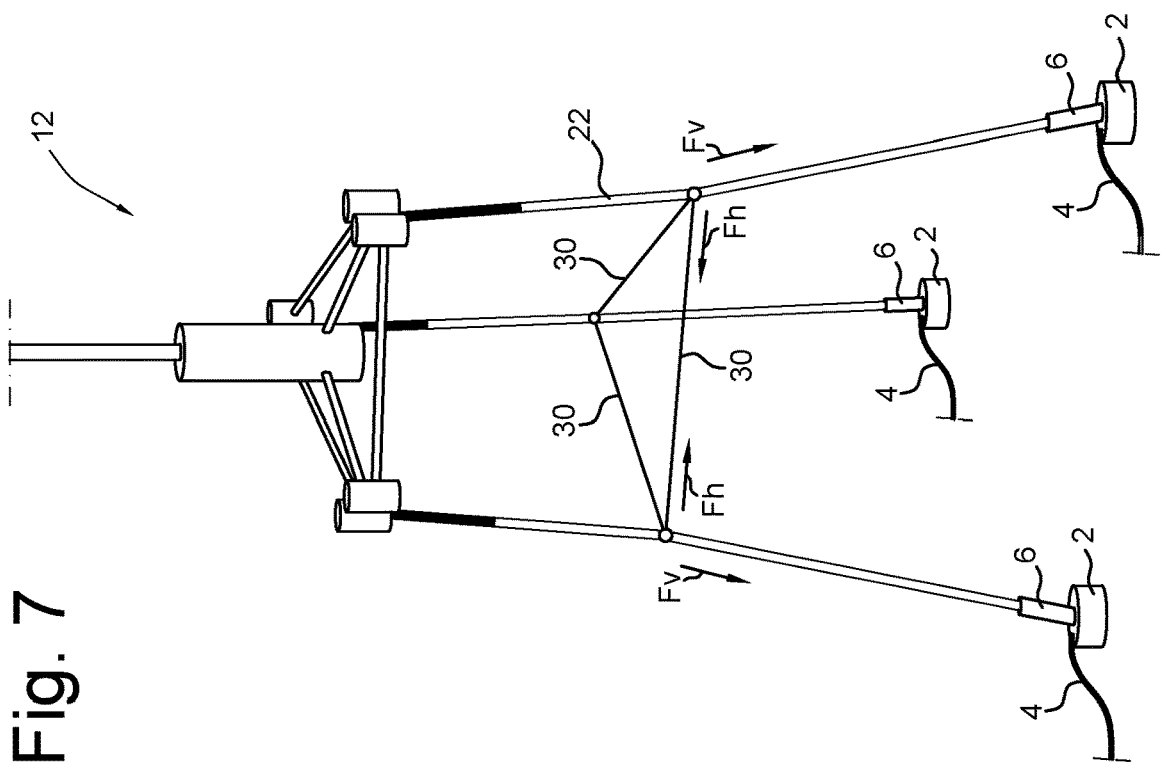
FIG. 7 shows a perspective view of the step of tensioning the connected tensioning line and messenger line and lowering the floating object to an installation level below sea surface, according to a further embodiment.

FIG. 7 shows a perspective view of the step of tensioning the connected tensioning line and messenger line and lowering the floating object to an installation level below sea surface, according to a further embodiment.

According to this embodiment, separate rigging lines 30 are provided between one pull-down line 22 that is attached to one anchor point 2 and two or more other pull-down lines 22 that are each attached to another anchor point 2 in a manner that a first series of horizontal links by the rigging lines is created between the pull-down lines.

The attachment of the rigging lines 30 to the pull-down lines can be performed on the tensioning lines 10 as part of the pull-down lines during the stages that the tensioning lines are laid down on the seabed. Alternatively, the rigging lines may be connected to the messenger lines 20 as part of the pull-down lines before or during the stage that the messenger lines are in slack mode hanging freely below the floating object. For example, the rigging lines 30 could be installed on the messenger lines at the time the floating object sets sail or at the time the messenger lines are lowered from the floating object.

The rigging lines 30 are positioned at substantially a same first predetermined level and provide that the first series of horizontal links between the pull-down lines enhances the stiffness of the pull-down mooring system (i.e., the arrangement of the pull-down lines between the anchor points and the buoyancy assemblies).

Typically, the rigging lines are configured with such a length that while tensioning the pull-down lines, the rigging lines become tensioned between each pair of pull-down lines to which they are connected. Thus the rigging lines exert a horizontal pulling force Fh (indicated by horizontal arrow) on the pull-down lines which causes that the pull-down lines are to some extent pulled horizontally towards each other when in tensioned mode (indicated by force Fv, vertical arrow).

In an embodiment, the rigging lines in the first series of horizontal links are arranged to form a simple polygon when viewed in a horizontal projection. Taking the arrangement of FIG. 7 as an example, since there are three anchor points and associated pull-down lines, the connections of the rigging lines are forming a triangle with the pull-down lines (or the anchor points) at the corners of the polygon.

According to the invention, there is no limitation in the number of anchor points, mooring legs and pull-down lines. With for example four anchor points or pull-down lines rigging lines would form a tetragon.

In a further embodiment, rigging lines may be provided at several predetermined levels to form multiple horizontal links between each pull-down line attached to one anchor point and at least two other pull-down lines each attached to a respective other anchor point. Each of the multiple horizontal links can be formed above or below the first predetermined level, in a similar manner as the first horizontal link as described above.

The rigging lines are made of ropes or cables of any suitable material known to the skilled person, such as steel or synthetic. The ropes or cables are dimensioned to create and withstand the horizontal forces as required by the rigging line construction.

The rigging lines arrangement that horizontally links the pull-down lines has the effect that the stiffness of the overall connection between the floating object and the anchor points during the "pull-down" phase relatively increases. Also, extreme loads on each of the pull-down lines are dampened by the rigging lines arrangement.

The rigging lines arrangement provides a passive alternative for active systems such as hydraulic or mechanical load dampers, as it offers the benefit of damping the mooring loads on the pull-down lines in a robust way by not using any mechanical active parts.

Figure 8:
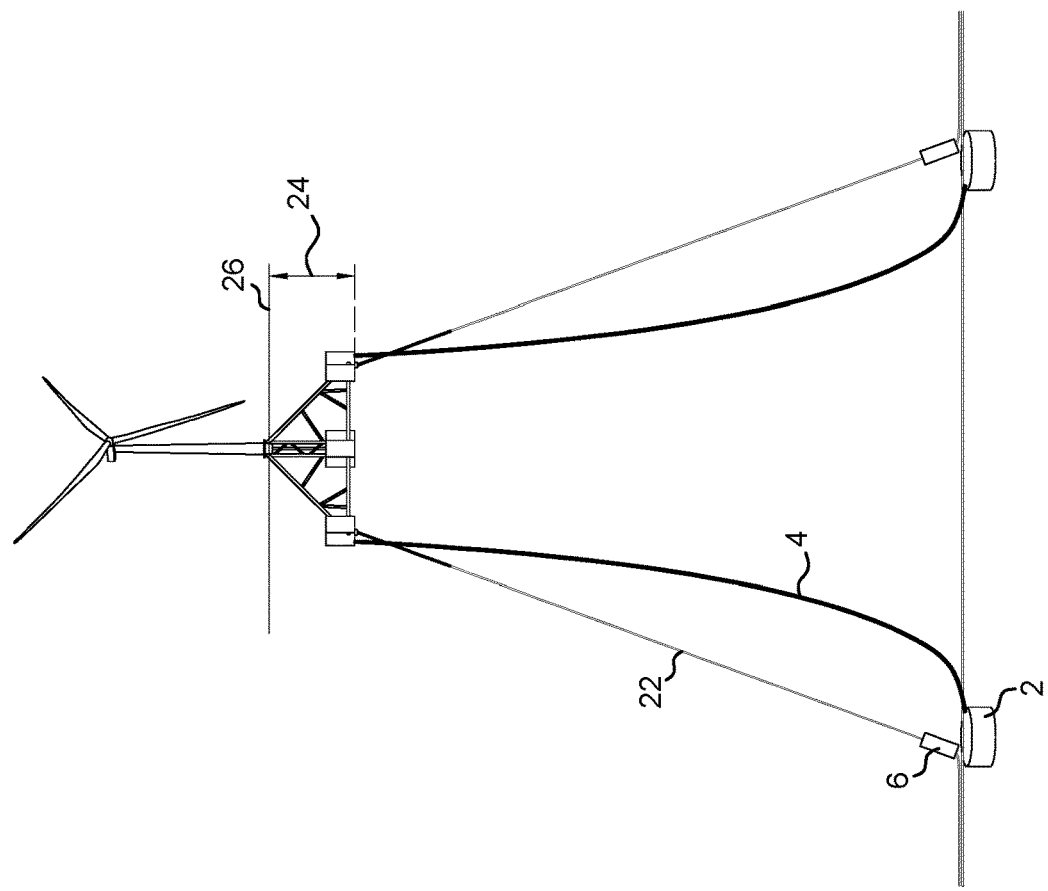
FIG. 8 shows schematically a step of connecting the mooring legs in slack mode to the floating object.

FIG. 8 shows schematically a step of connecting the mooring legs 4 in slack mode to the floating wind turbine 12.

Next, the mooring legs 4 (each comprising at least one mooring line) are each connected between the respective anchor point 2 and associated buoyancy assembly 16. In the exemplary embodiment, between each anchor point 2 and associated buoyancy assembly 16, a pair of mooring lines is connected. It will be appreciated in accordance with the invention that the number of mooring lines between each anchor point 2 and associated buoyancy assembly 16 will be at least one, depending on the design and installation requirements.

The free end of each mooring leg 4 is subsequently picked up by the crane of the installation vessel with the assistance of ROV, from the seafloor and brought close to the mooring line connector on the buoyancy assembly 16 associated with the mooring leg 4. The free end is then coupled mechanically to the mooring line connector of the associated buoyancy assembly. This step is repeated for each of the mooring lines on each buoyancy assembly.

During this step, the mooring legs are arranged to be in a slack mode, i.e., are not tensioned.

Figure 9:
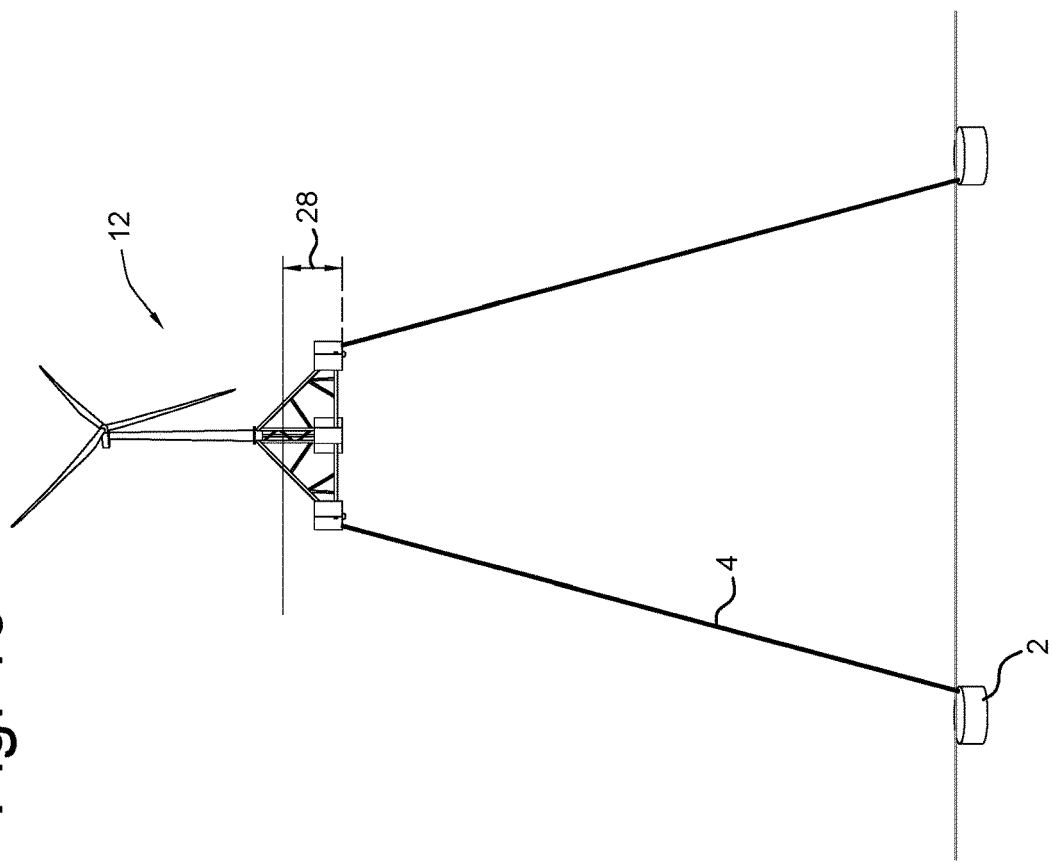
FIG. 9 shows schematically a step of tensioning the mooring legs.

FIG. 9 shows schematically a step of tensioning the mooring legs 4.

After the mooring legs 4 have been arranged between the anchor points 2 and the buoyancy assemblies 16, the method comprises an operation to tension the mooring lines.

During this operation, the pull-down lines 22 are paid out simultaneously which causes that the floating wind turbine 12 rises toward the water surface 26. At the same time the mooring legs 4 are pulled tight by the rising floating wind turbine. In this manner, the loads on the pull-down lines 22 are transferred to the mooring legs 4. During the pay-out operation the floating wind turbine 12 is allowed to rise from the installation elevation level 24 to an operation elevation level 28 below the water surface. The pulldown lines 22 are paid out until they are fully slackened and the loads are fully on the mooring legs 4.

Without limitation of the invention, in an illustrating example, the operation elevation level 28 is between about 20 and about 40 meter below water surface. The installation elevation level 24 will be between about 5 meter and about 10 meter below the operation elevation level. In this manner the floating wind turbine 12 will rise between about 5 to 10 meter during the tensioning of the mooring legs.

When the operational elevation level 28 has been reached, the floating wind turbine 12 is fully moored and stabilized by the mooring legs 4.

Figure 10:
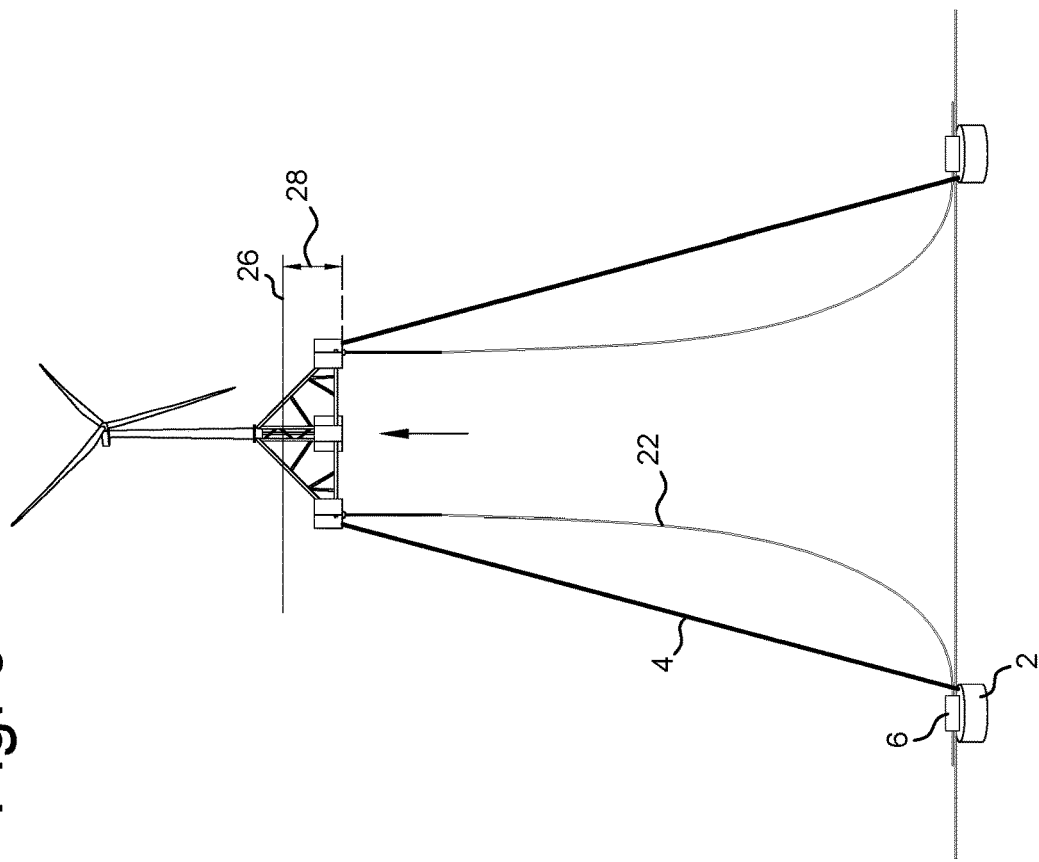
FIG. 10 shows schematically a floating object after installation with tensioned mooring legs between the floating object and the anchor points according to an embodiment of the invention.

FIG. 10 shows schematically a floating wind turbine 12 after installation with tensioned mooring legs 4 between the floating wind turbine and the anchor points 2 according to an embodiment of the invention.

After the installation, the pull-down lines 22, the rigging lines 30 (when previously installed), the tensioners 6 and the hydraulic system 8 are retrieved and can be re-used during installation of a next floating wind turbine.

In an embodiment, the method comprises that after the mooring legs 4 have been installed and been brought into tensioned mode, the following steps can be carried out:
    disconnecting each of the pull-down lines,
    removing the tensioner devices and
    retrieving the tensioner devices by the installation vessel.

According to a further embodiment, the disconnection of each pull-down line comprises:
    disconnecting the messenger line from the tensioning line;
    disconnecting the messenger line from the buoyancy assembly, and
    disconnecting the tensioning line from the tensioner device;
    retrieving at least either the tensioning line or the messenger line by the installation vessel.

Figure 11:
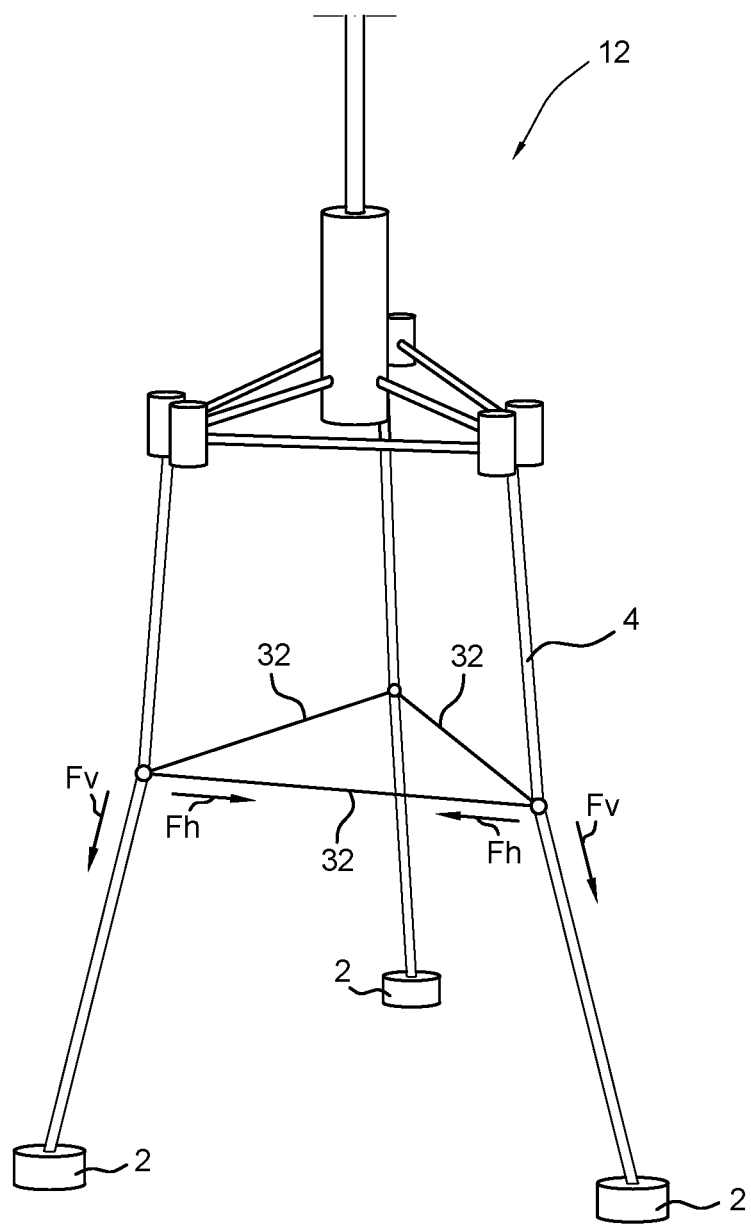
FIG. 11 shows a perspective view of a floating object after installation with tensioned mooring legs between the floating object and the anchor points according to a further embodiment of the invention.

FIG. 11 shows a perspective view of a floating object after installation with tensioned mooring legs between the floating object and the anchor points according to a further embodiment of the invention.

According to this embodiment, separate rigging lines 32 are provided between one mooring leg that is attached to one anchor point and two or more other mooring legs that are each attached to another anchor point in a manner that a third series of horizontal links by the rigging lines is created between the mooring lines. The arranging of the rigging lines 32 to the mooring legs is preferably performed during the stages that the mooring legs are laid down on the seabed. Optionally, the rigging lines may be connected to the mooring legs during the stage that the mooring lines are in slack mode while being connected to the buoyancy assemblies.

The rigging lines 32 are positioned at substantially a same predetermined level such that the third series of horizontal links between the mooring legs enhances the stiffness of the mooring system (i.e., the arrangement of mooring legs between the anchor points and the buoyancy assemblies).

Typically, the rigging lines are configured with such a length that while paying out the pull-down lines, the rigging lines become tensioned between the mooring legs to which they are connected. Thus, the rigging lines exert a horizontal pulling force Fh on the mooring lines which causes that the mooring lines are to some extent pulled horizontally towards each other when in tensioned mode (indicated by force Fv).

In an embodiment, the rigging lines in the third series of horizontal links are arranged to form a simple polygon when viewed in a horizontal plane projection. In the example of FIG. 11, since there are three anchor points and associated mooring lines, the connections of the rigging lines are forming a triangle with the mooring legs at its corners.

There is no limitation in the number of anchor points or mooring legs. With for example six anchor points a hexagon of rigging lines would be formed.

In a further embodiment, separate rigging lines may be provided at several predetermined levels below water surface to form multiple series of horizontal links between each mooring leg attached to one anchor point and each of at least two other mooring legs attached to a respective other anchor point. Each of the multiple horizontal links can be formed in a similar manner as the first horizontal link as described above.

The rigging lines are made of ropes or cables of any suitable material known to the skilled person, such as steel or synthetic.

The rigging lines arrangement that horizontally links the mooring legs has the effect that the stiffness of the overall connection between the floating object and the anchor points relatively increases. Also, extreme loads on each of the mooring legs are dampened by the rigging lines arrangement.

The rigging lines arrangement in this embodiment can be integrated permanently into a mooring system if needed, in the contrast to an active system. Furthermore, the rigging line arrangement can be more economical than active systems such as a complex mechanical heave compensation system.

In an alternative embodiment of the method to install a TLP based floating wind turbine, the method involves that the tensioning lines function as pull-down lines without the need for messenger lines. In this embodiment the tensioning lines are installed on the anchor points in the same manner as described above. When the tensioning lines are picked up from the seafloor, the free end of each tensioning line is mechanically connected directly to the associated buoyancy assembly while the tensioning line is slackened. Each tensioning line now functions as pull-down line as described above. The tensioning operation for the tensioning lines is the same as described above with reference to FIG. 6.

Furthermore, it is noted that in yet a further alternative embodiment the tensioner devices can be installed on the floating wind turbine instead of on the anchor points. The hydraulic system in this embodiment is installed on the floating wind turbine.

The present invention has the following advantages:
    The installation of the floating object can be done without any transfer of personnel or equipment onboard the floater, therefore improving the safety, and the operability of the hook-up (higher sea-state can be envisaged, substantially benefiting the overall installation planning);
    The subsea tensioners can be fitted with shock absorbers to increase operability and minimize dynamic peak loads;
    The hook-up is done without any equipment required to be installed on the floating object during onshore integration (thus reducing impact on fabrication critical path), and therefore without any equipment to be removed after hook-up, which is improving the safety for personal and material transfer, and reducing the collision risk between the installation vessel and the floating object;

The absence of installation heavy equipment and accessories on the floating object is favorable for the stability during towing to site;

The connection of permanent mooring legs is done without tension in the leg, allowing to plan for a simpler connector: it is therefore envisaged to design and use a connector without the pull-through requirement.

When the hook-up has been completed, the installation equipment is retrieved by the installation vessel and deployed on the next set of anchor points, which are offshore activities that can be planned during a time when the installation vessel was not occupied. It is therefore improving the overall project planning, since congested work onshore (installation preparation works) is now transferred to the available installation vessel.

The invention has been described with reference to some embodiments. Obvious modifications and alterations will occur to others upon reading and understanding the preceding detailed description. It is intended that the invention be construed as including all such modifications and alterations insofar as they come within the scope of the appended claims.

REFERENCES

Anchor point 2
Mooring leg 4
Location L
Subsea tensioner 6
Hydraulic support systems 8
Tensioning line 10
Floating wind turbine 12
Central body 14
Buoyancy assembly 16
Beam 18
Messenger line 20
Pull-down line 22
Installation elevation level 24
Sea surface (water surface) 26
Operation elevation level 28
Forces Fh, Fv
Rigging line 30, 32

The invention claimed is:

1. A method for installing a tension leg platform based floating object at a plurality of anchor points at sea using an installation vessel and a remotely operated underwater vehicle, ROV;
the floating object comprising a central body and at least three buoyancy assemblies positioned around the central body in a horizontal plane, with each of the buoyancy assemblies at least connected to the central body and adapted to be connected to an associated one of the anchor points,
the method comprising:
attaching a mooring leg comprising at least one mooring line at each anchor point;
for each anchor point connecting a pull-down line between each buoyancy assembly and the buoyance assembly's associated anchor point;
tensioning the pull-down lines such that the floating object is lowered with respect to the water surface to an installation elevation level below an operational elevation level;
for each anchor point connecting the mooring leg with the associated buoyancy assembly while the mooring leg is in slack mode,
after connecting the mooring lines with the buoyancy assemblies, paying out the pull-down lines to transfer load to the mooring legs such that the floating object rises upward from the installation elevation level to the operational elevation level where the mooring legs are in tensioned mode.

2. The method according to claim 1, further comprising adding at least a first series of links between the pull-down lines, by connecting separate rigging lines between a pull-down line attached to one of the anchor points and two or more pull-down lines selected from the other pull-down lines that are each attached to another of the anchor points, such that each pull-down line is connected with each one of two or more of the other pull-down lines by a respective separate rigging line.

3. The method according to claim 2, wherein in the tensioned mode of the pull-down lines, the rigging lines connected by the adding of the first series of links are substantially horizontal at a first predetermined level between the anchor points and the floating object.

4. The method according to claim 3, wherein in a horizontal plane projection the rigging lines in the first series of links form a simple polygon with a number of polygon corners equal to the number of anchor points, when the pull-down lines are in the tensioned mode.

5. The method according to claim 3, wherein the method further comprises adding at least a second series of links between the pull-down line attached to one of the anchor points and the two or more pull-down lines each attached to another of the anchor points, such that in the second series of links each pull-down lines is connected to two or more of the other pull-down lines by a respective separate rigging line; the second series of links being at a second predetermined level below or above the first predetermined level.

6. The method according to claim 3, further comprising adding at least a third series of links between the mooring legs, by connecting separate rigging lines between a mooring leg attached to one of the anchor points and two or more mooring legs selected from the other mooring legs that are each attached to another of the anchor points, such that each mooring leg is connected to two or more of the remaining mooring legs by a respective rigging line.

7. The method according to claim 2, wherein in a horizontal plane projection the rigging lines in the first series of links form a simple polygon with a number of polygon corners equal to the number of anchor points, when the pull-down lines are in the tensioned mode.

8. The method according to claim 7, wherein the method further comprises adding at least a second series of links between the pull-down line attached to one of the anchor points and the two or more pull-down lines each attached to another of the anchor points, such that in the second series of links each pull-down lines is connected to two or more of the other pull-down lines by a respective separate rigging line; the second series of links being at a second predetermined level below or above the first predetermined level.

9. The method according to claim 2, wherein the method further comprises adding at least a second series of links between the pull-down line attached to one of the anchor points and the two or more pull-down lines each attached to another of the anchor points, such that in the second series of links each pull-down lines is connected to two or more of the other pull-down lines by a respective separate rigging line; the second series of links being at a second predetermined level below or above the first predetermined level.

10. The method according to claim 2, further comprising adding at least a third series of links between the mooring legs, by connecting separate rigging lines between a mooring leg attached to one of the anchor points and two or more mooring legs selected from the other mooring legs that are each attached to another of the anchor points, such that each mooring leg is connected to two or more of the remaining mooring legs by a respective rigging line.

11. The method according to claim 1, further comprising adding at least a third series of links between the mooring legs, by connecting separate rigging lines between a mooring leg attached to one of the anchor points and two or more mooring legs selected from the other mooring legs that are each attached to another of the anchor points, such that each mooring leg is connected to two or more of the remaining mooring legs by a respective rigging line.

12. The method according to claim 1, wherein the step of tensioning the pull-down lines is carried out for each pull-down line either by a dedicated tensioner device installed on each anchor point or
by a dedicated tensioner device installed on the floating object.

13. The method according to claim 1, wherein said connecting the pull-down line between each buoyancy assembly and the buoyancy assembly's associated anchor point comprises:
connecting an end of a tensioning line to the tensioner device;
arranging a free end of each tensioning line on the seabed;
for each buoyancy assembly connecting an end of a messenger line to the buoyancy assembly;
letting a free end of the messenger line hang free for each buoyancy assembly, and
connecting the free end of the messenger line from each of the buoyancy assemblies with the free end of the tensioning line of the anchor point associated with the respective buoyancy assembly to form the pull-down line between each buoyancy assembly and the buoyancy assembly's anchor point.

14. The method according to claim 13, wherein either the adding of the at least first series of links is performed on tensioning lines as part of the pull-own lines while the tensioning lines are laying down on the seabed,
or the adding of the at least first series of links is performed on messenger lines as part of the pull-down lines while the messenger lines are hanging freely from the floating object.

15. The method according to claim 13, wherein said connecting the free end of the messenger line with the free end of the associated tensioning line comprises:
connecting the free end of the messenger line with a first end of a shock stabilizer element and
connecting a second end of the shock stabilizer element with the free end of the associated tensioning line.

16. The method according to claim 13, wherein said connecting the free end of the messenger line with the free end of the associated tensioning line comprises:
picking up the free end of the tensioning line from the seabed by the installation vessel,
transporting said free end to the free end of the messenger line and using ROV for coupling the free ends.

17. The method according to claim 1, wherein said connecting the pull-down line between each buoyancy assembly and the buoyancy assembly's associated anchor point comprises:
connecting an end of a tensioning line to the anchor point;
arranging a free end of each tensioning line on the seabed;
for each buoyancy assembly connecting an end of a messenger line to a dedicated tensioner device on the floating object;
letting a free end of the messenger line hang free for each buoyancy assembly, and
connecting the free end of the messenger line from each of the buoyancy assemblies with the free end of the tensioning line of the anchor point associated with the respective buoyancy assembly to form the pull-down line between each buoyancy assembly and the buoyancy assembly's anchor point.

18. The method according to claim 1, wherein the step of attaching the mooring leg at each anchor point further comprises:
arranging a free end of the mooring leg at the seabed and the step of connecting the mooring leg with the associated buoyancy assembly while the mooring leg is in slack mode comprises:
picking up the free end of the mooring leg from the seabed by the installation vessel,
transporting said free end to the associated buoyancy assembly and
attaching the free end of the mooring leg with a mooring line connector on the associated buoyancy assembly.

19. The method according to claim 1, wherein between each anchor point and associated buoyancy assembly the mooring leg consist of two or more mooring lines.

20. The method according to claim 1, wherein the central portion comprises a tower with at least one radial connecting element to each buoyancy assembly and the buoyancy assemblies are interconnected by transverse connecting elements, and wherein a wind turbine is mounted on a top of the tower.

* * * * *